(12) United States Patent
Malm et al.

(10) Patent No.: US 10,161,306 B2
(45) Date of Patent: Dec. 25, 2018

(54) NATURAL GAS ENGINES TO REDUCE NOX EMISSIONS

(71) Applicant: REM Technology Inc., Calgary (CA)

(72) Inventors: Howard Malm, Coquitlam (CA); Brian Robert Bobyk, Calgary (CA); Gregory Anthony Brown, Calgary (CA)

(73) Assignee: REM TECHNOLOGY INC., Calgary, Alberta (CA)

(*) Notice: Subject to any disclaimer, the term of this patent is extended or adjusted under 35 U.S.C. 154(b) by 136 days.

(21) Appl. No.: 15/179,263

(22) Filed: Jun. 10, 2016

(65) Prior Publication Data

US 2016/0363082 A1    Dec. 15, 2016

Related U.S. Application Data

(60) Provisional application No. 62/174,093, filed on Jun. 11, 2015.

(51) Int. Cl.

| | |
|---|---|
| *F02B 43/00* | (2006.01) |
| *F02B 43/10* | (2006.01) |
| *F02D 41/00* | (2006.01) |
| *F02P 5/15* | (2006.01) |
| *F02B 19/12* | (2006.01) |
| *F02P 5/152* | (2006.01) |
| *F02P 13/00* | (2006.01) |
| *F02D 35/02* | (2006.01) |
| *F02M 21/02* | (2006.01) |

(52) U.S. Cl.
CPC ............ *F02B 43/10* (2013.01); *F02B 19/12* (2013.01); *F02B 43/00* (2013.01); *F02D 41/0027* (2013.01); *F02P 5/1502* (2013.01); *F02P 5/152* (2013.01); *F02P 13/00* (2013.01); *F02B 2043/103* (2013.01); *F02D 35/027* (2013.01); *F02D 2250/36* (2013.01); *F02D 2400/11* (2013.01); *F02M 21/02* (2013.01); *F02M 21/0248* (2013.01); *F02M 21/0275* (2013.01); *Y02T 10/125* (2013.01); *Y02T 10/32* (2013.01); *Y02T 10/46* (2013.01)

(58) Field of Classification Search
CPC .......... F02B 43/10; F02B 43/00; F02B 19/12; F02B 2043/103; F02P 5/152; F02P 5/1502; F02P 13/00; F02D 41/0027; F02D 2250/36; F02D 35/027; F02D 2400/11; F02M 21/0248; F02M 21/02; F02M 21/0275; Y02T 10/125; Y02T 10/32

See application file for complete search history.

(56) References Cited

U.S. PATENT DOCUMENTS

| | | | |
|---|---|---|---|
| 4,864,989 A * | 9/1989 | Markley | ............... F02B 17/005 123/267 |
| 6,340,005 B1 * | 1/2002 | Keast | ...................... F02B 43/02 123/27 GE |
| 2011/0174263 A1 * | 7/2011 | Leone | ..................... F02B 47/02 123/25 C |

(Continued)

*Primary Examiner* — Hieu T Vo
*Assistant Examiner* — Sherman Manley
(74) *Attorney, Agent, or Firm* — Thompson Hine LLP

(57) ABSTRACT

A chambered sparkplug carrier and a natural gas engine management system are provided for reducing NOx emissions of pre-chambered combustion natural gas engines. A method for retro-fitting a pre-chambered combustion natural gas engine with a chambered sparkplug is also described.

18 Claims, 7 Drawing Sheets

(56) References Cited

U.S. PATENT DOCUMENTS

| | | | | |
|---|---|---|---|---|
| 2011/0174267 A1* | 7/2011 | Surnilla | ............... | F02D 35/027 123/406.29 |
| 2011/0174268 A1* | 7/2011 | Surnilla | ............... | F02D 35/027 123/406.29 |
| 2012/0024262 A1* | 2/2012 | Leone | .................. | F02D 35/027 123/406.47 |
| 2012/0029795 A1* | 2/2012 | Surnilla | ............... | F02D 35/027 701/111 |
| 2014/0000552 A1* | 1/2014 | Glugla | ................... | F02D 43/00 123/295 |
| 2017/0226922 A1* | 8/2017 | Tozzi | ..................... | F02B 19/08 |

* cited by examiner

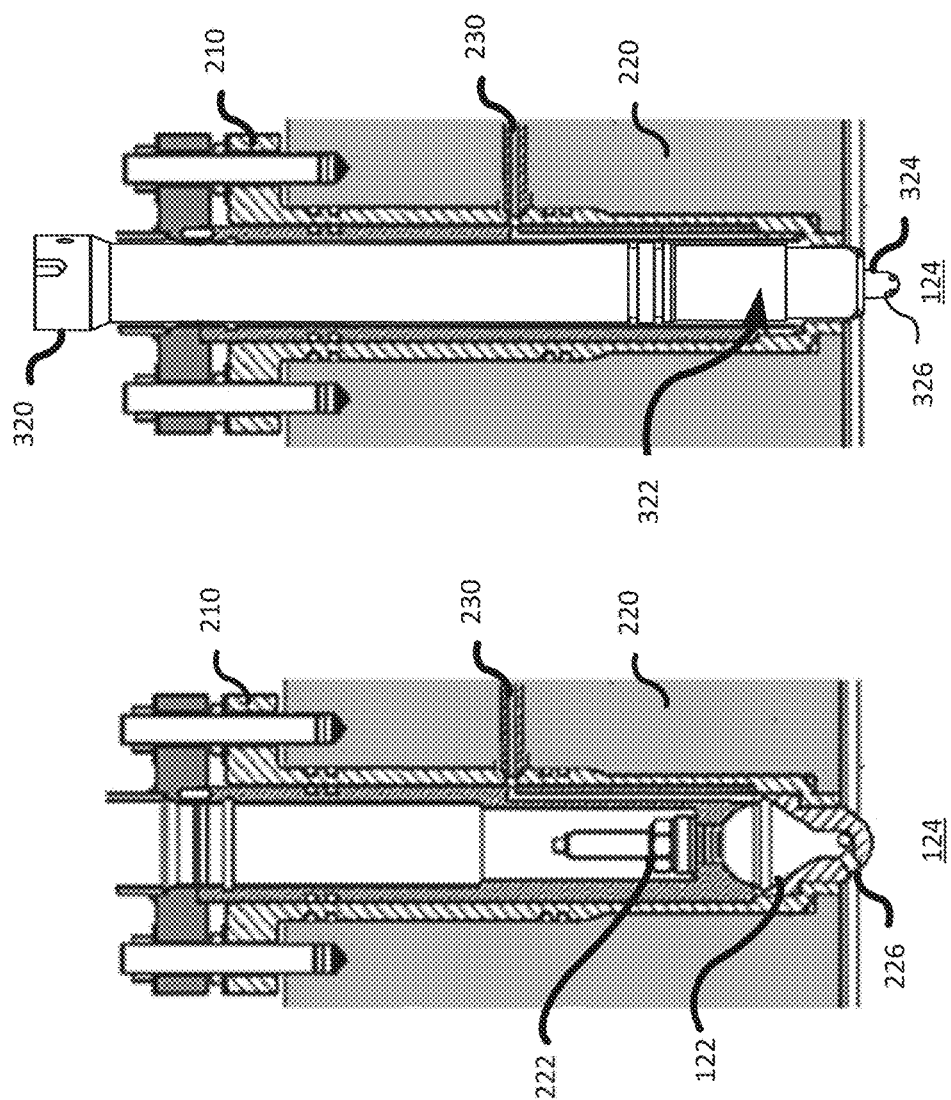

NATURAL GAS ENGINES TO REDUCE NOX EMISSIONS

CROSS-REFERENCE TO RELATED APPLICATIONS

This application claims priority from provisional patent application No. 62/174,093 filed Jun. 11, 2015 the entirety of which is hereby incorporated by reference for all purposes.

TECHNICAL FIELD

The present disclosure relates to emission reduction for natural gas engines and in particular to reducing NOx emissions.

BACKGROUND

To reduce the emissions of NOx (NO and NO2) and to use the natural gas fuel with high efficiency, engine manufacturers developed spark ignited reciprocating internal combustion engines (SI-RICE) that operated with very lean air to fuel ratios. In a lean mixture of air and fuel, there is more air present than necessary to fully combust the natural gas fuel. The presence of the excess air reduces the maximum temperature during the combustion period, which reduces the formation rate for nitrogen oxides (NOx). Nitrogen oxides in the atmosphere, under many conditions, cause the formation of ozone, which is harmful to plant and animal health. As a consequence, NOx emissions, or emission rates, are limited by regulation in many jurisdictions. As air-fuel mixtures become leaner (more excess air) NOx emissions are reduced. However, as the mixtures become leaner, the standard sparkplug is unable to reliably ignite the air-fuel mixtures.

To overcome this limitation a small pre-combustion chamber (PCC) is placed in or adjacent to the combustion zone in the engine. The air-fuel mixture in the PCC is controlled separately from the main combustion chamber, such that the mixture is made richer than the main combustion zone mixture. This enables a standard sparkplug to reliably ignite the mixture inside the PCC. As the mixture in the PCC expands, the hot, burning gases enter the main combustion chamber through several holes in the PCC. These burning gases are then able to more readily ignite the lean mixture in the main chamber than the standard sparkplug by itself. These gases expelled from the PCC have a relatively higher NOx concentration compared to the combustion products from the main chamber. The resulting NOx concentration in the exhaust gases comes from the sum of those produced in the PCC and the main combustion chamber. Since the PCC volume is only a few percent of the volume of the main chamber, the resulting NOx concentration is lower than can be achieved without a PCC.

Additional apparatus, including a gas admission valve and a separate fuel delivery apparatus such as the check valve and fuel regulator for the PCC as shown in FIG. 1, is required to ensure a richer air-fuel mixture in the PCC. The gas admission valve can fail to operate correctly and the PCC fuel delivery control can go out of adjustment, which requires engine adjustment or shutdown and gas admission valve replacement. To eliminate the need for a separate fuel system, PCCs using a standard sparkplug were designed to operate with the main chamber air-fuel mixture.

Some manufacturers have increased the compression ratio of engines with PCCs, as the very lean mixtures enable a more-efficient higher compression ratio to be used, compared with engines operated with a richer air-fuel mixture.

There are a number of natural gas engines currently in service having PCCs with the separate gas admission valves. In these engines, the additional apparatus required for the PCC design makes the engine more complex to optimize and more subject to malfunction than the open chamber engine with a standard spark plug. Hence, there is a need for a trouble-free implementation for engines with PCCs. For existing engines with PCCs and the associated apparatus, the innovations described in the following description can provide benefits to the users and owners of such engines.

Accordingly, systems and methods that enable emission reduction in natural gas engines remain highly desirable.

BRIEF DESCRIPTION OF THE DRAWINGS

Further features and advantages of the present disclosure will become apparent from the following detailed description, taken in combination with the appended drawings, in which:

FIG. 2 shows a representation of an engine head with PCC;

FIG. 3 shows a modified PCC engine head with a chambered spark plug;

It will be noted that throughout the appended drawings, like features are identified by like reference numerals.

DETAILED DESCRIPTION

Figure 1:
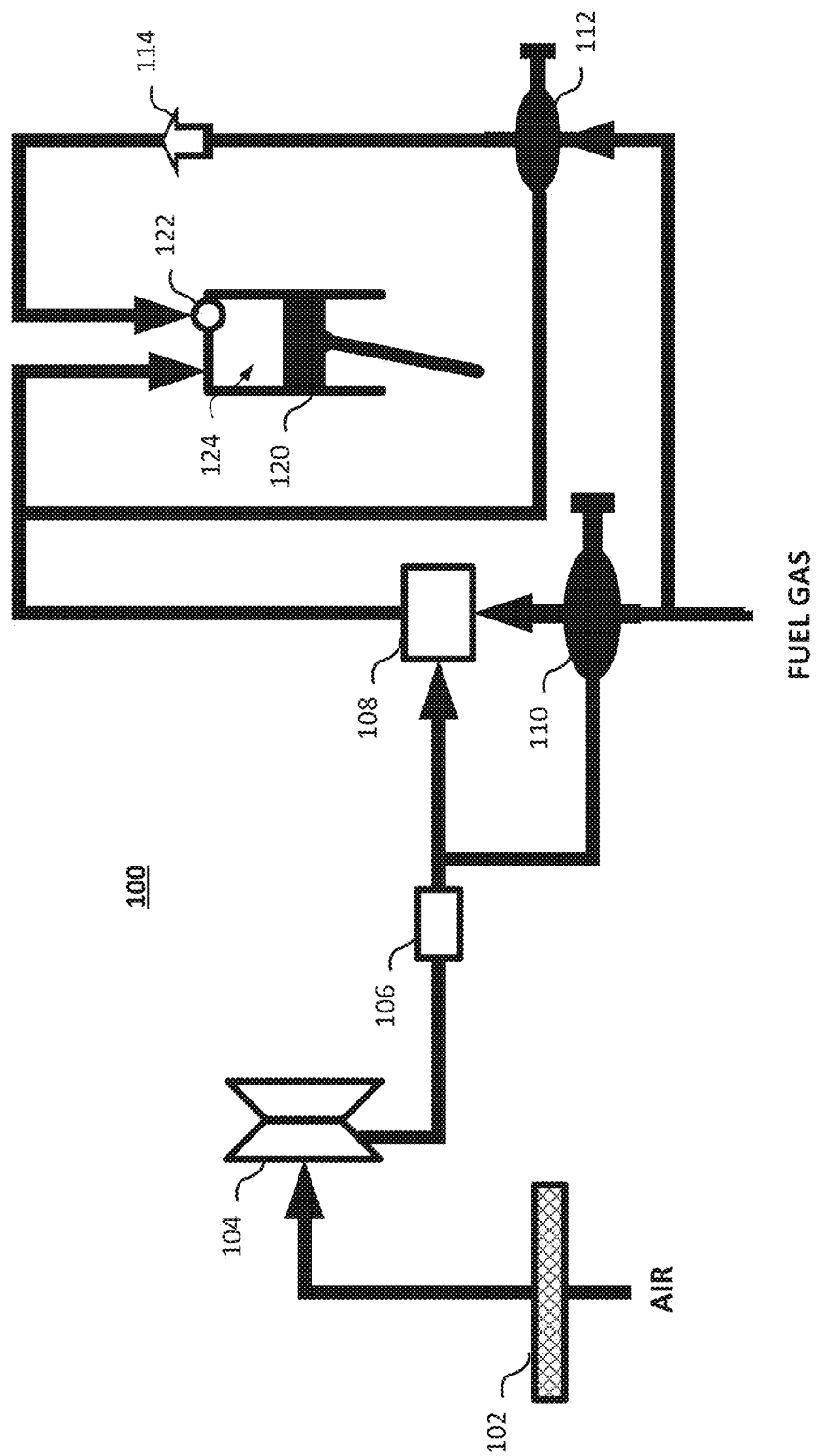
FIG. 1 shows a representation of an engine fuel system with PCC.

In accordance with an aspect of the present disclosure there is provided a method of modifying a pre-combustion chamber engine to reduce NOx emissions, the method comprising: removing pre-combustion chamber cylinder heads; disabling an admission valve assembly of the pre-combustion chamber engine; inserting a modified cylinder head for receiving a pre-chambered sparkplug in an extension tube; connecting the sparkplug to ignition terminals; connecting a detonation detection system to the engine; and modifying ignition timing of the pre-combustion chamber engine based upon signals received from the detonation detection system.

In accordance with an aspect of the method the ignition timing is determined by calculating Output %=$I_r$(FDen)+$I_r$($F_{s1}$)+Max [$I_r$(AMP), $I_r$(AMT), $I_r$(Fuel), $I_r$(Load), $I_r$(RPM), $I_r$(Det)]*[100−$I_r$(FDen)+$I_r$($F_{s1}$)] where $I_r$(AMP) is a calculated ignition retard % for an air manifold pressure; $I_r$(AMT) is a calculated ignition retard % for an air manifold temperature; $I_r$(Fuel) is a calculated ignition retard % for fuel flow; $I_r$(Load) is a calculated ignition retard % for load; $I_r$(RPM) is a calculated ignition retard % for RPM; $I_r$(FDen) is a calculated ignition retard % for density; $I_r$($F_{s1}$) is a calculated ignition retard % for supplemental gas flow; and $I_r$(Det) is a calculated ignition retard % for detonation.

In accordance with an aspect of the method the Output % is a difference between a desired Output % and the Output % according to actual timing value.

In accordance with an aspect of the method determining an Output % error wherein the Output % error is a difference between an actual output % and a desired output %.

In accordance with an aspect of the method an Output % error is compared to a specified minimum error for retard and a maximum error for advance.

In accordance with an aspect of the method if the Output % error becomes too large, then the Output % is retarded at a specified rate until the Output % error drops below a minimum error for retard.

In accordance with an aspect of the method the Output % error becomes less than the maximum % error for advance the Output % is advanced.

In accordance with an aspect of the method the ignition timing is modified until a stable condition is reached where neither advance nor retard occurs unless one of an operational parameter changes sufficiently.

In accordance with an aspect of the method a Waukesha™ VHP GL engine cylinder heads are replaced by a non-PCC cylinder heads from a Waukesha™ VHP GSI engine.

In accordance with an aspect of the present disclosure there is provided an engine management system comprising: an input/output (I/O) interface coupled to one or more sensors of a natural gas engine having chambered sparkplugs; a processor coupled to the I/O interface; a memory containing instructions which when executed by the processor for: receiving sensor data from the engine through the I/O interface; receiving a detonation signal from a detonation detection system from the engine; determining an output % from the sensor data; and generating a timing signal to advance or retard ignition timing to adjust the detonation signal to achieve a desired output %.

In accordance with an aspect of the engine management system the ignition timing is determined by calculating Output %=$I_r$(FDen)+$I_r$($F_{s1}$)+Max [$I_r$(AMP), $I_r$(AMT), $I_r$(Fuel), $I_r$(Load), $I_r$(RPM), $I_r$(Det)]*[100−$I_r$(FDen)+$I_r$($F_{s1}$)] where $I_r$(AMP) is a calculated ignition retard % for an air manifold pressure; $I_r$(AMT) is a calculated ignition retard % for an air manifold temperature; $I_r$(Fuel) is a calculated ignition retard % for fuel flow; $I_r$(Load) is a calculated ignition retard % for load; $I_r$(RPM) is a calculated ignition retard % for RPM; $I_r$(FDen) is a calculated ignition retard % for density; $I_r$($F_{s1}$) is a calculated ignition retard % for supplemental gas flow; and $I_r$(Det) is a calculated ignition retard % for detonation.

In accordance with an aspect of the engine management system the Output % is a difference between the desired Output % and the Output % according to actual timing value.

In accordance with an aspect of the engine management system the determining an Output % error wherein the Output % error is a difference between an actual output % and the desired output %.

In accordance with an aspect of the engine management system an Output % error is compared to a specified minimum error for retard and a maximum error for advance.

In accordance with an aspect of the engine management system if the Output % error becomes too large, then the Output % is retarded at a specified rate until the Output % error drops below a minimum error for retard.

In accordance with an aspect of the engine management system the Output % error becomes less than the maximum % error for advance the Output % is advanced.

In accordance with an aspect of the engine management system the ignition timing is modified until a stable condition is reached where neither advance nor retard occurs unless one of an operational parameter changes sufficiently.

In accordance with an aspect of the engine management system an engine air-fuel ratio and ignition timing is different compared to that of an original equipment manufacturers recommendations.

In accordance with an aspect of the engine management system a Waukesha™ VHP GL engine cylinder heads are replaced by non-PCC cylinder heads from a Waukesha™ VHP GSI engine.

In accordance with an aspect of the present disclosure there is provided a method of engine management in a natural gas engine having a chambered sparkplug, the method comprising: receiving sensor data from the engine; receiving a detonation signal from the engine from a detonation detection system; determining an output % from the sensor data and the detonation signal; and generating a timing signal to advance or retard ignition timing to adjust the detonation signal to achieve a desired output %.

In accordance with an aspect of the method the ignition timing is determined by calculating Output %=$I_r$(FDen)+$I_r$($F_{s1}$)+Max [$I_r$(AMP), $I_r$(AMT), $I_r$(Fuel), $I_r$(Load), $I_r$(RPM), $I_r$(Det)]*[100−$I_r$(FDen)+$I_r$($F_{s1}$)] where $I_r$(AMP) is a calculated ignition retard % for an air manifold pressure; $I_r$(AMT) is a calculated ignition retard % for an air manifold temperature; $I_r$(Fuel) is a calculated ignition retard % for fuel flow; $I_r$(Load) is a calculated ignition retard % for load; $I_r$(RPM) is a calculated ignition retard % for RPM; $I_r$(FDen) is a calculated ignition retard % for density; $I_r$($F_{s1}$) is a calculated ignition retard % for supplemental gas flow; and $I_r$(Det) is a calculated ignition retard % for detonation.

In accordance with an aspect of the method the Output % is a difference between the desired Output % and the Output % according to actual timing value.

In accordance with an aspect of the method determining an Output % error wherein the Output % error is a difference between an actual output % and the desired output %.

In accordance with an aspect of the method an Output % error is compared to a specified minimum error for retard and a maximum error for advance.

In accordance with an aspect of the method the Output % error becomes too large, then the Output % is retarded at a specified rate until the Output % error drops below a minimum error for retard.

In accordance with an aspect of the method the Output % error becomes less than the maximum % error for advance the Output % is advanced.

In accordance with an aspect of the method the ignition timing is modified until a stable condition is reached where neither advance nor retard occurs unless one of an operational parameter changes sufficiently.

In accordance with an aspect of the method an engine air-fuel ratio and ignition timing is different compared to that of an original equipment manufacturers recommendations.

In accordance with an aspect of the method a Waukesha™ VHP GL engine cylinder heads are replaced by non-PCC cylinder heads from a Waukesha™ VHP GSI engine.

In accordance with an aspect of the present disclosure there is provided a chambered sparkplug carrier for a natural gas engine, the chambered sparkplug carrier comprising: an circular shaft for receiving a chambered sparkplug within a first end of the shaft, the chambered sparkplug engaged with the shaft by threads at a tip of the first end wherein a combustion chamber of the chambered sparkplug extends beyond the tip of the first end; an internal extension coupling the chambered sparkplug to an ignition system at a second end of the shaft; and wherein the chambered sparkplug carrier is used in a pre-combustion chamber engine to replace the pre-combustion chamber with the chamber sparkplug carrier.

In accordance with an aspect of the chambered sparkplug the ignition timing of the engine is modified to be advanced or retarded to achieve a desired output % of the engine.

In accordance with an aspect of the chambered sparkplug the ignition timing of the is modified by engine management system by receiving a detonation signal from the natural gas engine.

In accordance with an aspect of the chambered sparkplug further comprises outer threads on the circular shaft for engaging the cylinder head.

In accordance with an aspect of the chambered sparkplug further comprises bolts for engaging the cylinder head.

In accordance with an aspect of the chambered sparkplug wherein a Waukesha™ VHP GL engine cylinder heads are replaced by non-PCC cylinder heads from a Waukesha™ VHP GSI engine.

Embodiments are described below, by way of example only, with reference to FIGS. 1-9. The schematic for an engine 100 with a pre-combustion chamber (PCC) is shown in FIG. 1. Intake air to the engine passes through an air cleaner 102, a turbo charger 104 and intercooler 106 before entering a carburetor 108. An engine cylinder 120 receives air-fuel mixture from carburetor 108 where the fuel gas is supplied through a biased fuel pressure regulator 110. The PCC 122, shown by a circle at the top of the main combustion chamber 124 of an engine cylinder 120 has small holes to permit the flow of gases into and out of the main combustion chamber 124. In the operation of a four-stroke cycle engine during the downward intake stroke while a very lean air-fuel mixture enters the main chamber 124 through the open intake valve, fuel to the PCC is supplied through a check valve 114 and a biased fuel pressure regulator 112. During the compression stroke the very lean air-fuel mixture from the main chamber 124 flows into the PCC 122. The check valve 114 prevents the previously added fuel from being expelled. A spark plug (not shown) in the PCC ignites the richer air-fuel mixture in the PCC 122. The ensuing combustion causes the gases to reach a higher pressure than is present in the main chamber 124. These hot burning gases consequently flow out into the main chamber 124 igniting the very lean air-fuel mixture in the main chamber 124. In the power stroke force is transmitted to the engine crankshaft (not shown). In the exhaust stroke the exhaust gases from the PCC 122 and the main chamber 124 are expelled to the engine exhaust system through the main chamber 124 exhaust valve. The whole sequence of operation is then repeated. FIG. 1 is shown for illustrative purposes, it should be understood that there are a variety of possible PCC fuel or air-fuel delivery arrangements. In addition supplementary gas source may be utilized to power the engine. The supplementary gas can be provided by captured vent gas in oil production and storage and used by the engine to reduce vent gas emissions by combusting excess gas. The supplemental gas flow displaces a portion of the main fuel flow requirement of the engine and may be of a different composition than the main fuel source.

A cross-section of an engine head showing the PCC and the gas admission valve is shown in FIG. 2. The PCC 122 is positioned in the main chamber 124 of the cylinder head 220. During the intake stroke, when the lean air-fuel mixture is drawn into the main chamber 124, the PCC admission valve 230 opens to enable some fuel to enter the PCC 122. During the compression stroke, the PCC admission valve 230 closes and some of the lean air-fuel mixture from the main chamber 124 enters the PCC 122 to mix with the fuel previously admitted. A few degrees before top-dead center (TDC); the spark discharge from the spark plug 222 ignites the mixture in the PCC 122. The hot, burning gases expand into the main chamber 124, igniting the lean mixture through openings 226. During the expansion stroke and subsequent exhaust stroke the gas admission valve 230 remains closed to prevent the hot combustion gases from flowing back to the PCC 122 air-fuel mixing apparatus.

Referring to FIG. 3, a modified PCC engine cylinder is shown where the PCC is replaced with a chambered sparkplug. To extend the lean limit the chambered sparkplug can be utilized having a small chamber around the normal sparkplug electrodes which serves as a region where conditions for igniting a lean air-fuel mixture are optimized. Such chambered sparkplugs are available commercially from Altronic™ and Multitorch™. Use of these chambered sparkplugs in combination with leaner operation can be effective in reducing NOx emissions from SI-RICEs. A sparkplug carrier can be used to replace the original PCC and spark plug carrier items with a single plug carrier that allows the chambered spark plug to extend into the combustion chamber. In FIG. 3 the PCC is replaced with the chambered spark plug 322 provided inside the carrier 320 inserted in the PCC cylinder head 220. The modified spark plug carrier 320 is used to hold the chambered spark plug 322 in place and position the ignition chamber 324 in the main chamber 124. The chamber 324 of the chamber spark plug 322 is filled through the orifices 326 during the compression stroke with the same lean mixture as that in the main chamber 124. The volume of the chamber 324 is a much smaller fraction of the combustion chamber than the typical PCCs 122. The PCC admission valve 230 in the igniter sleeve 210 is bypassed with the installation of the chambered spark plug 322 and spark plug carrier 320.

Figure 5:
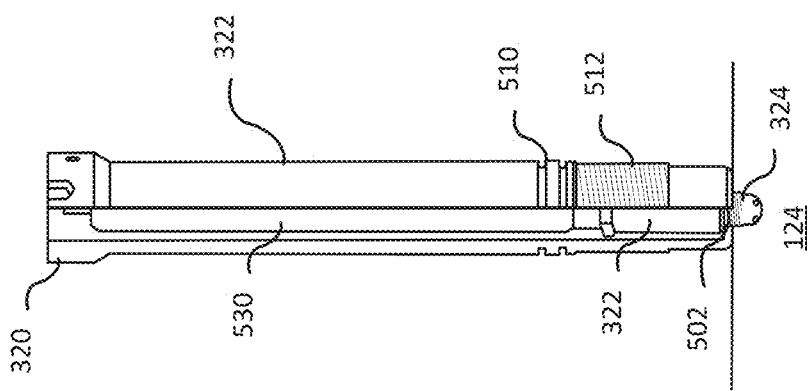
FIG. 5 shows a sectioned view of the plug carrier and modified extension.
Figure 4:
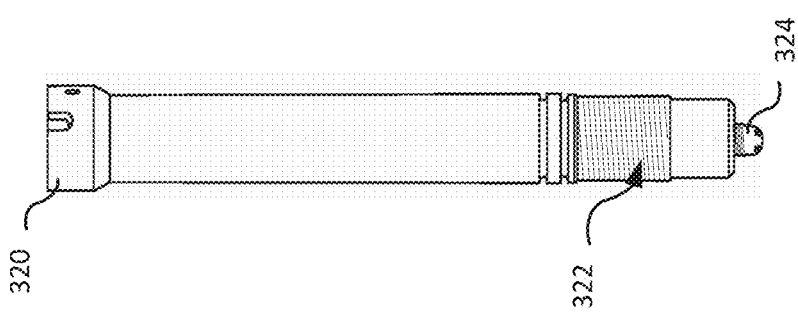
FIG. 4 shows a plug carrier and modified extension.

By replacing the PCC 122 and its sparkplug 222 with a modified sparkplug carrier 320 and a chambered sparkplug 322, the need for a separate PCC, gas admission valve 230, and apparatus for the PCC can be eliminated. The sparkplug carrier 320 is shown in FIG. 4. FIG. 5 shows a sectioned view of the plug carrier 320. The chambered spark plug 322 is engaged to the sparkplug carrier 320 by threads 502. An extender 530 inside the spark plug carrier 320 connects to the coil ignition terminals or leads. O-ring grooves 510 may be provided are on the outside of the plug carrier 320 to create a seal with the cylinder head 220 if a seal if the sleeve 210 seals with the cylinder head. Cylinder head threads 512 are provided to retain the sparkplug carrier 320 within the cylinder head 220 is a modified igniter sleeve 210 is utilized with receiving threads. Alternatively, the sparkplug carrier 320 may be a bolt-in to replace the PCC and not require cylinder thread heads 512.

Figure 6:
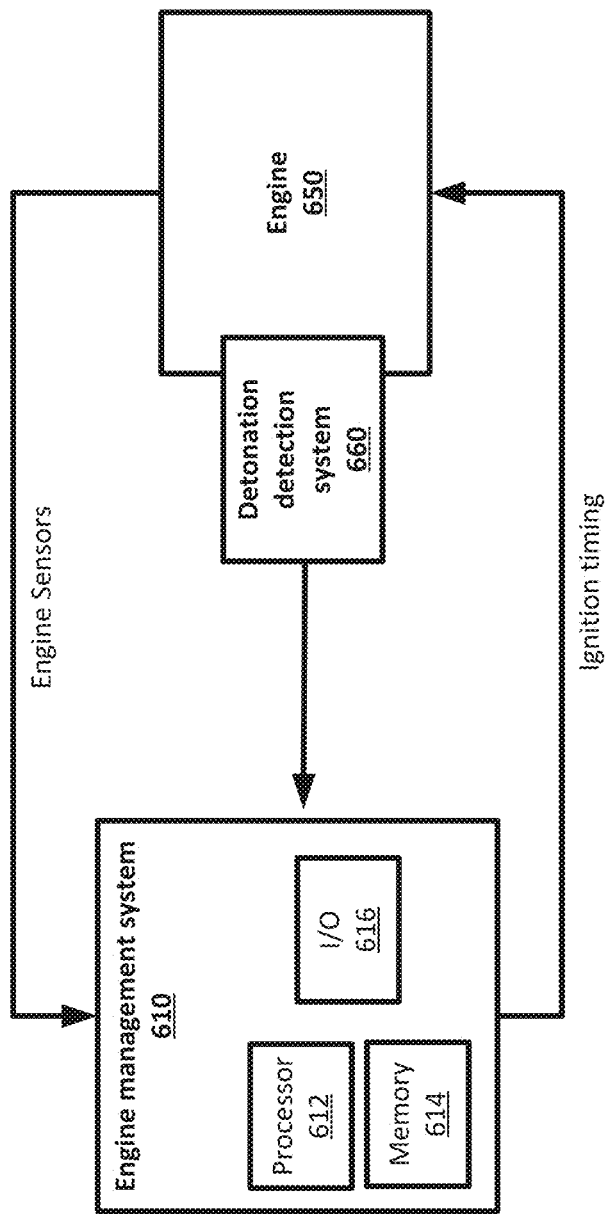
FIG. 6 shows a representation of an engine management system.

Referring to FIG. 6, the engine 650 is controlled by an engine management system (EMS) 610. The change in combustion conditions between the original engine and the modified engine with the single plug carrier and chamber spark plug requires a modified ignition timing advance and retard algorithm that includes an input from a detonation detection system 660 in addition engine sensors from speed, temperature etc. The detonation detection system 660 can be added as part of the retrofit application of PCC engine to chamber sparkplug carrier system. The EMS 610 changes provides a modified ignition timing advance and retard algorithm. The EMS 610 comprises a processor 612 and memory 614 containing instructions which when executed by the processor are for controlling the ignition of the engine. Input/Output (I/O) interface 616 can receive sensor data or signals from the engine such as detonation detection, air manifold pressure, air manifold temperature, engine load, rotation per minute (RPM), fuel flow rate, and fuel density and provide modified ignition timing to control the modified engine 650 with chambered sparkplugs.

For the high compression engine where detonation is more likely compared to the lower compression engine the inclusion of detonation with the other items which may control engine timing is important to avoid premature cylinder failure. Due to the need to have ignition advance and lean operation under load without excessive intake temperatures, the ignition control was integrated with the air control to optimize engine operation with the available turbo-charger output. The modified engine ignition control enables starting and warm-up with retarded ignition timing and then slowly advances the ignition timing to a maximum depending on the availability of sufficient cool air.

Normally the spark ignition timing is described in degrees before top-dead-centre (TDC). A timing advance means that the spark ignition occurs earlier than the previous reference timing, while a timing retard means the spark ignition occurs later than the previous reference timing.

Figure 7:
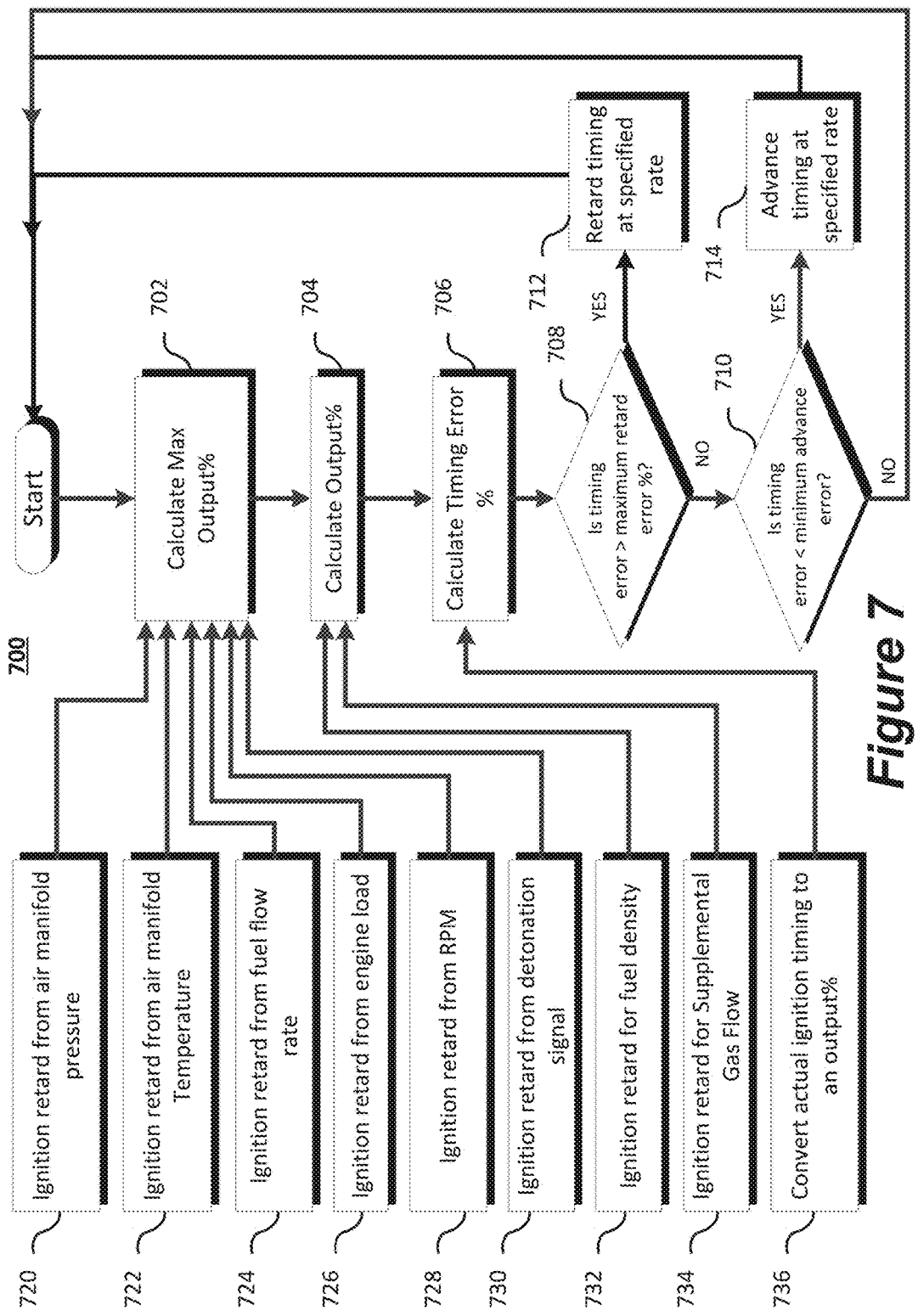
FIG. 7 shows a method of ignition timing.

With reference to the method shown in FIG. 7, ignition advance operates by receiving sensor data and providing ignition timing for the natural gas engine. The desired ignition retard from the maximum allowed advance is expressed as an output percentage of the difference in degrees between the advance and retard angles. Each parameter for which the timing can be adjusted is included. The formula for the contribution of each parameter to the ignition retard effect is specific to each engine type. The final output percentage is calculated according to the formula below. The output percentage is then converted to an electrical or software value appropriate to control the spark ignition timing.

$$\text{Output \%} = I_r(F\text{Den}) + I_r(F_{s1}) + \text{Max}\ [I_r(\text{AMP}), I_r(\text{AMT}), I_r(\text{Fuel}), I_r(\text{Load}), I_r(\text{RPM})]^*[100 - I_r(F\text{Den}) + I_r(F_{s1})]$$

Where $I_r(\text{AMP})$ is the calculated ignition retard % for the air manifold pressure (720)

$I_r(\text{AMT})$ is the calculated ignition retard % for the air manifold temperature (722)

$I_r(\text{Fuel})$ is the calculated ignition retard % for fuel flow (724)

$I_r(\text{Load})$ is the calculated ignition retard % for load (726)

$I_r(\text{RPM})$ is the calculated ignition retard % for RPM (728)

$I_r(F\text{Den})$ is the calculated ignition retard % for density (732)

$I_r(F_{s1})$ is the calculated ignition retard % for supplemental gas flow (734).

For a high compression engine detonation, the uncontrolled initiation of combustion ignition, is a known problem. The original detonation system acts on the ignition timing control to retard the ignition timing in a step change. This is incompatible with the previously developed ignition control strategy. For the incorporation of the detonation signal, rates of timing advance and retard were used and incorporated into the above expression for ignition output. A detonation input is added to the above expression as shown to calculate the maximum output percentage (702). The output % can then be calculated (702) according to:

$$\text{Output \%} = I_r(F\text{Den}) + I_r(F_{s1}) + \text{Max}\ [I_r(\text{AMP}), I_r(\text{AMT}), I_r(\text{Fuel}), I_r(\text{Load}), I_r(\text{RPM}), I_r(\text{Det})]^*[100 - I_r(F\text{Den}) + I_r(F_{s1})]$$

where $I_r(\text{Det})$ is the calculated ignition retard % for detonation (730)

Figure 8:
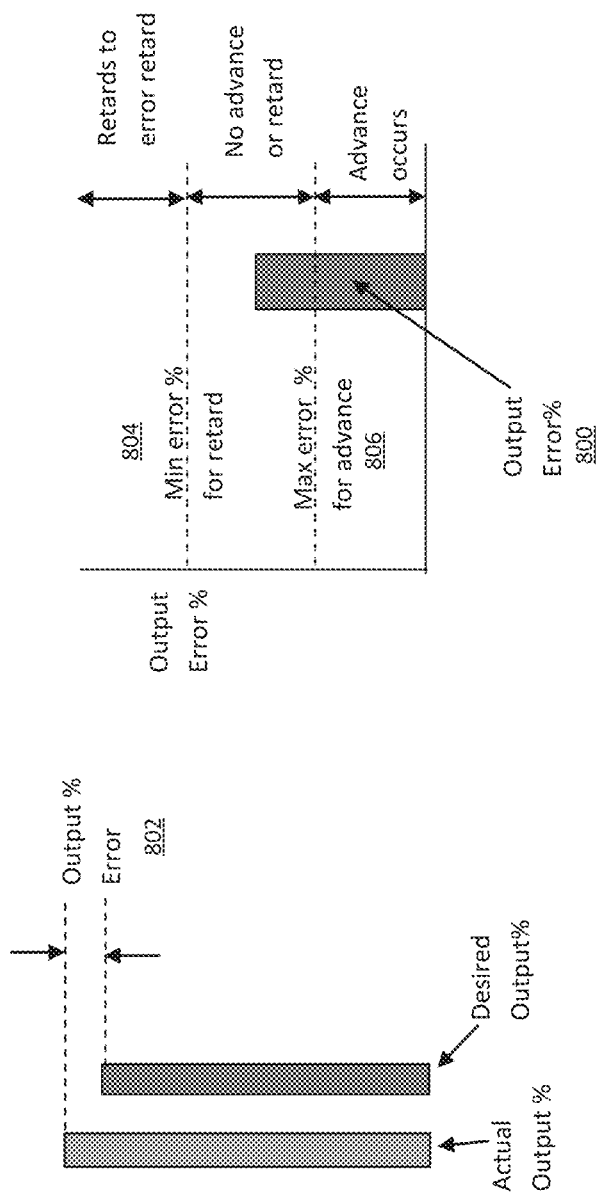
FIG. 8 a representation of determining advance or retard determination.

The ignition timing angle is then $\text{Ign} - I_{ret}*\text{Output \%}/100$

Where Ign is the ignition timing angle BTDC $I_{ret}$ is the maximum ignition retard amount Also with reference to FIG. 8, an Output % error is calculated 802, which is the difference between the desired Output % and the Output % according to actual timing value. The Output % error signal 800 is compared to the specified minimum error 804 for retard and a maximum error 806 for advance (706). If the error signal becomes too large (YES at 708), then the Output % is retarded at the specified rate (712) of retard until the error drops below the minimum error for retard. Similarly, if the error signal becomes less than the maximum error percentage (YES at 710) for advance the Output % is advanced (714). Typically the rate of retard is greater than the rate of advance. Eventually the ignition timing reaches a stable condition where neither advance nor retard occurs unless one of the operational parameters changes sufficiently.

Alternatively, a cylinder head design with a PCC can be replaced by a non-PCC head design for the same engine block but with a chambered sparkplug in place of the normal spark plug if the replacement head is suitable for the higher pressure associated with the higher compression ratio. This can remove the need for a modified sparkplug carrier however the ignition timing method of FIG. 7 is still required.

Both designs enable NOx emission concentration limits achievable with the engine heads with PCCs with or without separate fuel delivery systems to be met by the chambered sparkplug either with a modified sparkplug carrier or with a non-PCC head. It is recognized that, to achieve the desired NOx emission limits, the engine air-fuel ratio and ignition timing is different compared to that of the original equipment manufacturers' recommendations.

Figure 9:
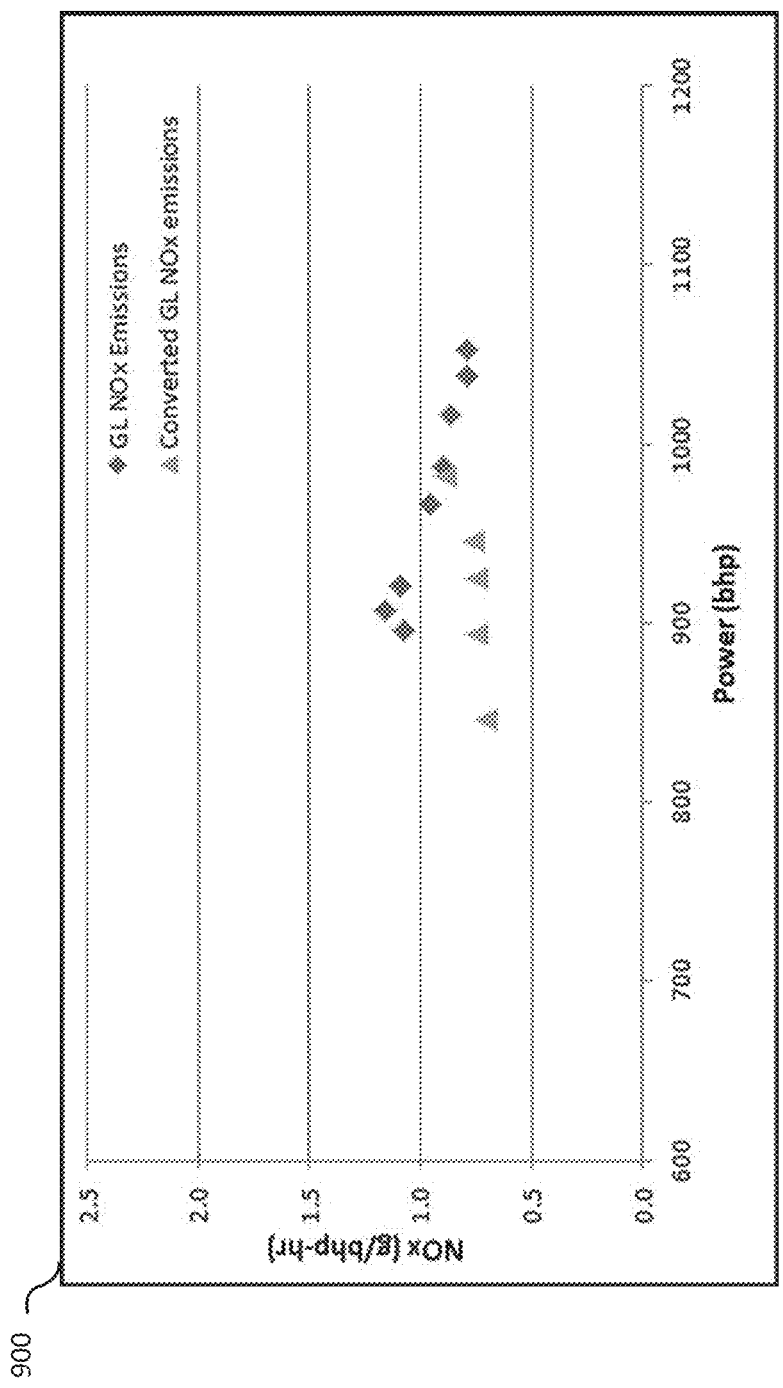
FIG. 9 shows a comparison of NOx emission between a PCC and converted PCC engine.

FIG. 9 is a graph 900 showing comparison of NOx emissions where the cylinder heads for a Waukesha™ VHP GL engine (GL NOx emissions), which has a PCC as shown in FIG. 2, were replaced by the non-PCC cylinder heads from a Waukesha™ VHP GSI engine and chambered sparkplugs (converted GL NOx emissions). The Waukesha™ VHP GSI heads do not have a PCC or a gas admission valve. For this engine type, carbon monoxide (CO) and total hydrocarbon (THC) emissions reductions can also be expected because there are no high CO concentrations from the PCC and there are fewer crevice volumes and quenching surfaces with the GSI cylinder head and the chambered sparkplug, compared to the GL cylinder head.

The result of the innovative plug carrier and ignition control is that regulated exhaust emissions are either reduced or not increased with a simpler arrangement that is less prone to mal-adjustment or malfunction. Furthermore, if the original engine with the heads modified for PCCs has a modification for a higher compression ratio, the higher compression feature can be retained with the innovation.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-9 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. An engine management system, comprising:
   an input/output (I/O) interface coupled to one or more sensors of a natural gas engine having chambered sparkplugs;
   a processor coupled to the I/O interface;
   a memory containing instructions, which when executed by the processor for:
   receiving sensor data from the engine through the I/O interface;
   receiving a detonation signal from a detonation detection system from the engine;
   determining an ignition output % from the sensor data; and
   generating a timing signal to advance or retard ignition timing to adjust the detonation signal to achieve a desired ignition output % of the engine;
   wherein ignition timing is determined by calculating ignition Output %=$I_r$(FDen)+$I_r$($F_{s1}$)+Max [$I_r$(AMP), $I_r$(AMT), $I_r$(Fuel), $I_r$(Load), $I_r$(RPM), $I_r$(Det)]*[100−$I_r$(FDen)+$I_r$($F_{s1}$)];
   where $I_r$(AMP) is a calculated ignition retard % for an air manifold pressure; $I_r$(AMT) is a calculated ignition retard % for an air manifold temperature; $I_r$(Fuel) is a calculated ignition retard % for fuel flow; $I_r$(Load) is a calculated ignition retard % for load; $I_r$(RPM) is a calculated ignition retard % for RPM; $I_r$(FDen) is a calculated ignition retard % for density; $I_r$($F_{s1}$) is a calculated ignition retard % for supplemental gas flow; and $I_r$(Det) is a calculated ignition retard % for detonation.

2. The engine management system of claim 1, wherein the ignition Output % is a difference between the desired ignition Output % and the ignition Output % according to actual timing value.

3. The engine management system of claim 2, further comprising determining an ignition Output % error wherein the ignition Output % error is a difference between an actual ignition output % and the desired ignition output %.

4. The engine management system of claim 3, wherein an ignition Output % error is compared to a specified minimum error for retard and a maximum error for advance.

5. The engine management system of claim 4, wherein if the ignition Output % error becomes too large, then the ignition Output % is retarded at a specified rate until the ignition Output % error drops below a minimum error for retard.

6. The engine management system of claim 5, wherein if the ignition Output % error becomes less than the maximum % error for advance, the ignition Output % is advanced.

7. The engine management system of claim 1, wherein the ignition timing is modified until a stable condition is reached where neither advance nor retard occurs unless one of an operational parameter changes sufficiently.

8. The engine management system of claim 1, wherein an engine air-fuel ratio and ignition timing is different compared to that of an original equipment manufacturer's recommendations.

9. The engine management system of claim 1, wherein Waukesha™ VHP GL engine cylinder heads are replaced by non-PCC cylinder heads from a Waukesha™ VHP GSI engine.

10. A method of engine management in a natural gas engine having a chambered sparkplug, the method comprising:
    receiving sensor data from the engine;
    receiving a detonation signal from the engine from a detonation detection system;
    determining an ignition output % from the sensor data and the detonation signal; and
    generating a timing signal to advance or retard ignition timing to adjust the detonation signal to achieve a desired ignition output %;
    wherein ignition timing is determined by calculating ignition Output %=$I_r$(FDen)+$I_r$($F_{s1}$)+Max [(AMP), $I_r$(AMT), $I_r$(Fuel), $I_r$(Load), $I_r$(RPM), $I_r$(Det)]*[100−$I_r$(FDen)+$I_r$($F_{s1}$)];
    where $I_r$(AMP) is a calculated ignition retard % for an air manifold pressure; $I_r$(AMT) is a calculated ignition retard % for an air manifold temperature; $I_r$(Fuel) is a calculated ignition retard % for fuel flow; $I_r$(Load) is a calculated ignition retard % for load; $I_r$(RPM) is a calculated ignition retard % for RPM; $I_r$(FDen) is a calculated ignition retard % for density; $I_r$($F_{s1}$) is a calculated ignition retard % for supplemental gas flow; and $I_r$(Det) is a calculated ignition retard % for detonation.

11. The method of claim 10, wherein the ignition Output % is a difference between the desired ignition Output % and the ignition Output % according to actual timing value.

12. The method of claim 11, further comprising determining an ignition Output % error wherein the ignition Output % error is a difference between an actual ignition output % and the desired ignition output %.

13. The method of claim 12, wherein an ignition Output % error is compared to a specified minimum error for retard and a maximum error for advance.

14. The method of claim 13, wherein if the ignition Output % error becomes too large, then the ignition Output % is retarded at a specified rate until the ignition Output % error drops below a minimum error for retard.

15. The method of claim 14, wherein if the ignition Output % error becomes less than the maximum % error for advance, the ignition Output % is advanced.

16. The method of claim 11, wherein the ignition timing is modified until a stable condition is reached where neither advance nor retard occurs unless one of an operational parameter changes sufficiently.

17. The method of claim 10, wherein an engine air-fuel ratio and ignition timing is different compared to that of an original equipment manufacturer's recommendations.

18. The method of claim 10, wherein Waukesha™ VHP GL engine cylinder heads are replaced by non-PCC cylinder heads from a Waukesha™ VHP GSI engine.

* * * * *